Figures 1, 2:
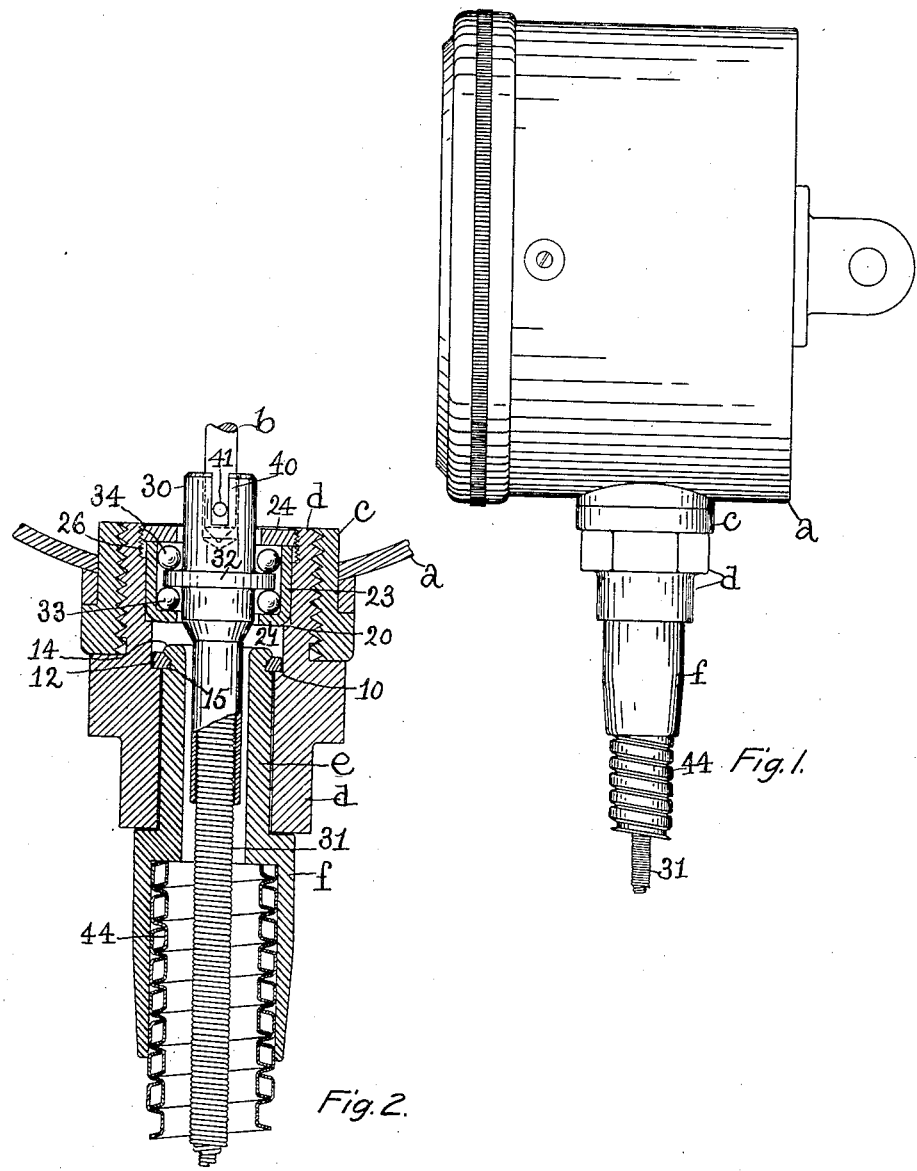

L. E. BLANCHARD.
SPEEDOMETER.
APPLICATION FILED DEC. 10, 1909.

1,129,329.

Patented Feb. 23, 1915.

Witnesses.
C. I. Babcock
J. Murphy

Inventor.
Leow E. Blanchard
per
Jas. H. Churchill
Attorney.

UNITED STATES PATENT OFFICE.

LEON E. BLANCHARD, OF BOSTON, MASSACHUSETTS, ASSIGNOR, BY MESNE ASSIGNMENTS, TO EDWARD T. NEWTON, OF HOLYOKE, MASSACHUSETTS.

SPEEDOMETER.

1,129,329.   Specification of Letters Patent.   Patented Feb. 23, 1915.

Application filed December 10, 1909. Serial No. 532,352.

*To all whom it may concern:*

Be it known that I, LEON E. BLANCHARD, a citizen of the United States, residing in Boston, county of Suffolk, and State of Massachusetts, have invented an Improvement in Speedometers, of which the following description, in connection with the accompanying drawings, is a specification, like letters on the drawings representing like parts.

This invention relates to speedometers and more particularly to the coupling employed to connect the flexible shaft with the casing of the instrument.

The invention has for its object to increase the accuracy, durability and salability of the speedometer; to avoid strains and jars on the governor shaft, and to prevent disengagement of the flexible shaft from the governor shaft. To this end, the coupling is composed of two members, one of which is adapted to be secured to the casing of the instrument and will be hereinafter referred to as the fixed member, and the other member of said coupling is rotatably connected with the fixed member. The fixed member is provided with an end disk or wall having an opening through which the flexible shaft is extended, and which coöperates with a device on the said shaft to limit the end motion of the flexible shaft away from the casing and thereby prevent accidental disengagement of the flexible shaft from the governor shaft, in the operation of the motor vehicle with which the speedometer is used. The end wall or disk referred to, may also form a seat or raceway for ball bearings interposed between it and the device on the flexible shaft. These and other features of this invention will be pointed out in the claims at the end of this specification.

Figure 1 is a side elevation of a speedometer embodying this invention, and Fig. 2, an enlarged detail in section and elevation of the coupling and flexible shaft shown in Fig. 1.

Referring to the drawing, *a* represents the casing of a speedometer of that class having a speed indicator or pointer actuated by a governor, a portion only of the shaft *b* of which is shown, as that is all that is necessary to show for a full understanding of the invention. The casing *a* in line with the governor shaft *b* is provided with an opening in which is inserted an internally threaded hub or boss *c*, which is soldered or otherwise firmly secured to the casing *a*.

The internally threaded boss *c* has engaged with it an externally threaded sleeve *d* constituting the fixed member of the coupling, within which is extended the reduced end *e* of a sleeve *f*, which constitutes the rotatable member of the coupling.

The rotatable member *f* is restrained from longitudinal movement from the fixed member by a shoulder 10 on the interior of the fixed member, which is engaged by a ring or washer 12 secured to the reduced end portion *e* of the member *f* by an overturned lip 14 of the latter, which locks the washer 12 in an annular groove 15 on the exterior of the end *e*. The fixed member *d* is also provided with a second annular shoulder 20, against which seats a ring or disk 21, which is shown in the present instance as forming the bottom of a cup or cylinder 23, having coöperating with it a top disk or washer 24, which overlaps the upper end of the cup or cylinder and is externally threaded to engage screw-threads 26 on the inner circumference of the fixed member *d* of the coupling.

The top and bottom disks or walls 24, 21 of the cup or cylinder 23 are provided with holes for the passage of a head 30 on the end of a flexible shaft 31, said head as herein shown having an annular flange 32, which coöperates with two sets of balls 33, 34, located in the cup or cylinder 23 and interposed between the flange 32 and the disks or walls 21, 24. The head 30 is provided as shown with a longitudinal slot 40 at its end for the reception of a stud or pin 41 on the governor shaft. The rotatable member *f* has attached to it in the usual manner, the usual protective spiral casing 44 for the flexible shaft.

By reference to Fig. 2, it will be seen that the head 30 of the flexible shaft is prevented from moving longitudinally to any material extent in either direction by the flange 32, balls 33, 34, and disks or walls 21, 24, with the result, that the liability of the flexible shaft 31 becoming accidentally disengaged from the governor shaft *b* is reduced to a minimum. Furthermore, the flexible shaft 31 is provided at its end near the speedometer, which, for sake of clearness, may be designated the upper end, with ball bearings, upon which said end turns, thereby avoiding oscillation or vibration of the speed indicating hand or pointer of the instrument, especially at slow speeds of the automobile or other vehicle, and consequently increasing the accuracy, durability and salability of the instrument.

By preventing end movement of the flexible shaft in opposite directions, jars or strains on the governor shaft $b$ of the instrument are avoided, and the life and accuracy of the instrument in this respect is thereby increased.

While I may prefer to employ two sets of ball bearings, good results may be obtained with the lower set 33 alone, as the outward movement of the flexible shaft predominates, and also while I prefer to use ball bearings, they may be omitted and a highly useful construction would remain, as the disk 21 would engage the flange 32 and prevent outward movement of the flexible shaft and disengagement of the the latter from the governor shaft.

Claims—

1. In a speedometer, in combination, a casing having an internally threaded sleeve secured thereto, a governor shaft located within the casing in line with said sleeve, a flexible shaft, a coupling for connecting said flexible shaft with said casing and comprising an externally threaded fixed member engaging said internally threaded sleeve, a rotatable member extended into said fixed member, means for preventing disengagement of said rotatable member from said fixed member, a disk located within the said fixed member and having a hole through which the flexible shaft is extended, a head on the end of the flexible shaft having on its exterior a device which coöperates with said disk to prevent longitudinal movement outward from the coupling of said flexible shaft, and retain the said shaft in said fixed member when the latter is removed from the instrument, and means to connect the flexible shaft with the governor shaft, substantially as described.

2. In a speedometer, in combination, a flexible shaft, a coupling for the flexible shaft comprising a fixed member capable of being secured to the instrument, and a second member in rotatable engagement with said fixed member, ball bearings for the flexible shaft located within the fixed member of said coupling, means to insure a fixed position for the ball bearings within the said fixed member, and means to restrict longitudinal movement of said flexible shaft out of said fixed member and retaining the said shaft in said fixed member when the latter is removed from the instrument, substantially as described.

In testimony whereof, I have signed my name to this specification in the presence of two subscribing witnesses.

LEON E. BLANCHARD.

Witnesses:
JAS. H. CHURCHILL,
J. MURPHY.